United States Patent [19]

Derks

[11] Patent Number: 5,379,213
[45] Date of Patent: Jan. 3, 1995

[54] TEST SCORING SYSTEM AND METHOD
[75] Inventor: Harry G. Derks, Holland, Mich.
[73] Assignee: Fleetwood Furniture Company, Inc., Holland, Mich.
[21] Appl. No.: 826,987
[22] Filed: Jan. 28, 1992
[51] Int. Cl.⁶ .......................................... G06F 15/28
[52] U.S. Cl. .................. 364/411; 434/322; 434/332
[58] Field of Search ........... 364/410, 411, 419, 429.01; 434/322, 332, 334, 336; 395/800, 227, 275, 325

[56] References Cited

U.S. PATENT DOCUMENTS

| | | | |
|---|---|---|---|
| 3,245,157 | 4/1966 | Laviana | 35/9 |
| 3,314,172 | 4/1967 | Boyett | 35/48 |
| 3,401,469 | 9/1968 | Shaver et al. | 35/8 |
| 3,491,464 | 1/1970 | Gray | 35/48 |
| 3,500,559 | 3/1970 | Jones et al. | 35/48 |
| 3,579,864 | 5/1971 | Littwin | 434/436 |
| 3,623,242 | 11/1971 | Hoover | 434/336 |
| 3,631,612 | 1/1972 | Westerberg | 434/436 |
| 3,810,316 | 5/1974 | Lahlou | 434/320 |
| 4,048,729 | 9/1977 | Derks | 434/320 |
| 4,052,798 | 10/1977 | Tomita et al. | 434/336 |
| 4,205,464 | 6/1980 | Baggott | 434/336 |
| 4,415,065 | 11/1983 | Sandstedt | 235/383 |
| 4,433,387 | 2/1984 | Dyer et al. | 364/900 |
| 4,654,818 | 3/1987 | Wetterau, Jr. | 395/709.12 |
| 4,682,958 | 7/1987 | Slavik et al. | 434/335 |
| 4,820,167 | 4/1989 | Nobles et al. | 434/336 |
| 4,877,408 | 10/1989 | Hartsfield | 434/350 |
| 5,068,787 | 11/1991 | Pipella et al. | 364/406 |
| 5,093,786 | 3/1992 | Derks | 395/800 |

OTHER PUBLICATIONS

Microprocessors from Chips to Systems 3rd Edition by Rodnay Zaks 1980 pp. 128–140.

Primary Examiner—Roy N. Envall, Jr.
Assistant Examiner—Frantzy Poinvil
Attorney, Agent, or Firm—Price, Heneveld, Cooper, Dewitt & Litton

[57] ABSTRACT

A test scoring system and method of testing a plurality of individuals utilizes a hand-held answer recording unit for each individual including a user operable input device for receiving and storing user answers. A scoring processor is provided for receiving answer data from each answer recording unit and comparing the answers with an answer key in order to determine conforming answers. A data transfer unit is connected with the scoring processor to receive answer data from the answer recording unit and transfer the answer data transparently to the scoring processor. Each student is provided a hand-held answer recording unit, along with a test, which is typically in written format. The user scrolls through the answer locations in the hand-held answer recording unit and inputs in each location an answer to each question. When the test is completed, the answer recording unit is juxtaposed with the data transfer unit and the data transfer unit produces a single bit discharge signal that is transferred to the answer recording unit across a physically impervious boundary. The answer recording unit responds to the discharge signal by transferring in sequential order all of the answer data across the physically impervious boundary to the data transfer unit. The data transfer unit includes a decoding circuit that responds to only the leading edges of the answer data signal in order to accurately decode the signal and, thus, allow a faster rate of data transfer. The decoded answer data is transferred to the scoring processor.

22 Claims, 7 Drawing Sheets

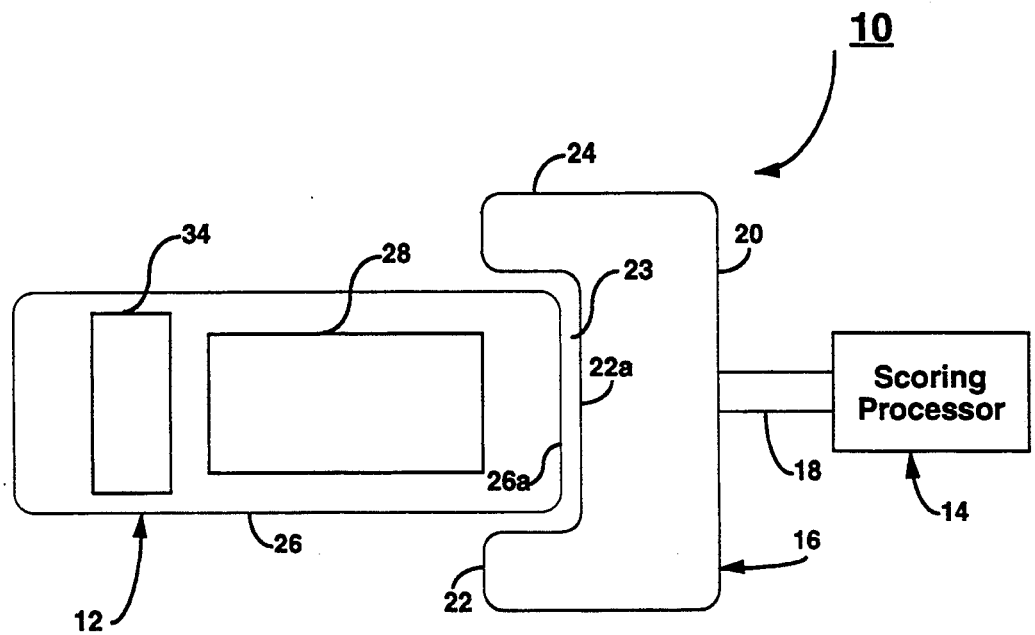
Fig. 1
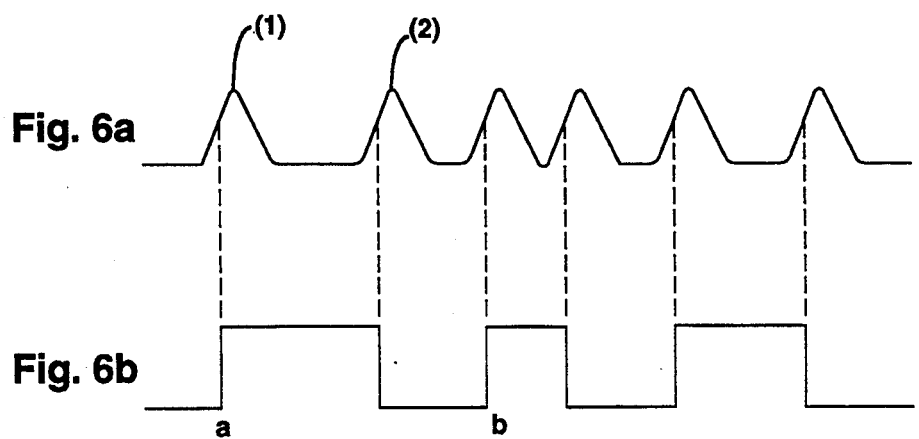
Fig. 6a
Fig. 6b

TEST SCORING SYSTEM AND METHOD

BACKGROUND OF THE INVENTION

This invention relates generally to systems and methods for recording and scoring answers and, more particularly, to collecting answers to multiple-choice questions so that the answers may be compared with an answer key. The invention is especially adapted to individually testing a group of students.

Electronic response systems have been provided for rapidly retrieving responses from individuals to multiple-choice questions. One such system is disclosed in my co-pending application Ser. No. 303,163 filed Nov. 10 1988 for a WIRELESS RESPONSE SYSTEM WITH ACKNOWLEDGEMENT. Such response system provides real time responses to questions posed to a group and has a variety of applications. For example, in a business environment, a preference survey may be taken of a large group, with various items presented to the group and the response of the group obtained to each item. In an educational setting, such system would allow a teacher of a large group of students to occasionally quiz the group to determine the level of comprehension and, thereby, adjust the presentation to the group's ability to absorb the material. Such system may additionally facilitate multiple-choice testing of individuals in a class in order to determine a grade for each student for a particular portion of a course.

When it is desired to present a multiple-choice test to a large number of students in order to determine a grade for each individual student, it is desirable to allow each student to complete the test at his or her own pace. In this manner, it will not be necessary to test the class at the rate of the slowest student and students wishing to take longer to complete the test, or one particular question, will not feel undue pressure from their peers.

An electronic system that allows students to answer multiple-choice test questions at his or her own pace is disclosed in U.S. Pat. No. 4,654,818 issued to Lin C. Wetterau, Jr. for a DATA PROCESSING DEVICE HAVING MEMORY SELECTIVELY INTERFACING WITH COMPUTER (Wetterau, Jr.). In Wetterau, Jr. each student is provided a hand-held device having a keypad, a display, a CPU, a read only memory (ROM) and a random access memory (RAM). The CPU supplies data to the display and RAM and receives data from the keypad and ROM. In use, multiple-choice questions are stored in the ROM and retrieved by the CPU and displayed. The user is prompted either from the display or a voice synthesizer to input an answer using the keypad. The answer is stored in the RAM at a select address location and the user may be provided an indication whether the answer is correct. After the user has completed all of the questions, the hand-held device is inserted into a connector slot in a central computer. The CPU of the hand-held device is deactivated and the CPU of the central computer addresses the RAM of the device in order to retrieve the data stored therein. The retrieved data is analyzed in the central computer.

The Wetterau, Jr. system is not without its shortcomings. The storage of the questions and answer key in the ROM of the hand-held device requires that the program stored in ROM be changed in order to administer different tests. This is not only cumbersome, but limits the length of the questions, as well as the makeup of the answer choices, that may be administered using the system. Furthermore, a backup system of power must be provided in order to retain data in the volatile memory during periods of non-use. The engagement of electrical connectors on the hand-held device and the central computer in order to provide the central computer access to the memory bus of the hand-held device for retrieving data is cumbersome to use for a large number of students. In addition, the exposed electrical contacts are vulnerable to damage from various substances, such as chewing gum, pencils and the like, often in the possession of students taking tests.

SUMMARY OF THE INVENTION

The purpose of the present invention is to overcome the difficulties of prior scoring systems and methods. In particular, the present invention provides a unique test scoring system and method that allows each student to work at his or her own pace. When a student has completed the test, the answers are retrieved and scored in a very convenient manner without making the system vulnerable to external damage. Test question and answer compositions of any length and complexity can be created and applied with little effort. Results for each student are displayed immediately upon transfer of the answer data to the scoring processor.

The present invention is embodied in a test scoring system having a hand-held answer recording unit for each individual, including a user-operable response means for receiving and storing user answers. A scoring processor is provided for receiving and answering answer data from the answer recording units. According to one aspect of the invention, a data transfer unit is connected with the scoring processor to receive answer data from the answer recording unit and transfer the answer data to the scoring processor. The data transfer unit includes means for providing a discharge signal to the answer recording unit. The answer recording unit is responsive to the discharge signal to read-out answer data recorded in the answer recording unit. Because the answer recording unit is capable of reading-out answer data, it is not necessary to provide, to the scoring processor, CPU access to the memory bus of the answer recording unit for retrieving data from the answer recording unit. This, in combination with the capability of the answer recording unit to read-out answer data in response to a simple discharge signal, allows a communication link between the answer recording unit and the data transfer unit that need be fast and accurate in one direction only.

According to another aspect of the invention, the data transfer unit provides the discharge signal to the answer recording unit and receives the answer data from the answer recording unit across a physically impervious boundary. This significantly reduces the vulnerability of the system to damage from foreign substances such as chewing gum, pencils and the like. Furthermore, the necessity of engaging electrical connectors is eliminated which makes the retrieving of answer data exceptionally fast and easy.

A method according to the invention includes providing each tested individual with a hand-held recording unit and a set of prepared test questions. The hand-held recording unit has a means for selecting one of a plurality of memory locations and for storing an answer in each of the memory locations. The hand-held recording unit further includes means for sequentially retrieving answers from the memory locations in response to a discharge signal. Each individual selects a memory location in their respective recording unit for storing a chosen answer for particular questions. Upon completion of the test, each individual juxtaposes their recording unit with a data transfer unit which is connected with a scoring processor. The scoring processor supplies a discharge signal to the recording unit and transfers the answers retrieved from the recording unit to the scoring processor in order to determine conforming answers.

In a disclosed embodiment, the hand-held answer recording unit includes an answer reading means that is responsive to a discharge signal for reading the answers from the unit's memory, including a first transducer that is adapted to both receiving the discharge signal and transferring answers to the transfer unit. In this embodiment, the data transfer unit includes a second transducer that is adapted to both transferring the discharge signal to the recording unit and receiving answers from the answer recording unit. The discharge signal may be generated by the data transfer unit in response to a command from the scoring processor. The data transfer unit may additionally generate a second, clear signal, in response to a command from the scoring processor, in order to clear answers from the memory of the transfer unit.

In a preferred embodiment, the first transducer in the answer reading means of the answer recording unit includes a first tuned resonant circuit having a first antenna. The second transducer in the data transfer means includes a second tuned resonant circuit having a second antenna. The answer reading means of the answer recording unit may also include a first logic circuit adapted to reading answers from the memory means of the unit and selectively applying energy to the first tuned resonant circuit to cause the first antenna to transmit a signal. The answer reading means also includes a monitor circuit connected with the first tuned resonant circuit and responsive to the first antenna receiving a discharge signal in order to cause the first logic circuit to read answers from the memory means of the unit. In this embodiment, the data transfer unit includes a bidirectional data port and a second logic circuit connected with the data port and the second tuned resonant circuit. The said second logic circuit is adapted to responding to a signal received by the data port by selectively applying energy to the second tuned resonant circuit to generate the discharge signal. The data transfer unit further includes a decoding circuit connected with the second resonant circuit and the data port and responsive to an answer signal received by the second antenna in order to produce data on the data port.

This embodiment of the invention provides an effective transmission link that allows the hand-held answer recording units to be responsive at all times to a discharge signal, while providing a capability, using the same transducer, to transfer answers through physically impervious walls of the answer recording unit and the data transfer unit. The data transfer unit interfaces with a bidirectional data line, such as a conventional RS232 serial port, to allow the scoring processor to command the data transfer unit to generate the discharge signal using the second transducer and to thereafter transfer decoded signals received by the second transducer to the scoring processor for analysis.

In a most preferred embodiment, the data transfer unit may include an transition-responsive circuit that changes state in response to one of the leading edge, or the trailing edge, of the envelope of the transmitted answer signal. It has been discovered that, while the width of a continuous-wave signal transmitted from the answer recording unit to the data transfer unit may vary significantly depending upon factors, including the precise positioning of the hand-held answer recording unit and the data transfer unit, the timing between the leading edge of sequential bursts of continuous wave signal are predictable. Accordingly, the answer data supplied by the hand-held recording unit is coded in a manner that the signal provided to the data port by the edge responsive circuit changes state in response to each burst from the hand-held answer recording unit. In this manner, the timing of the answer signal is significantly improved and facilitates a greater baud rate between the data transfer unit and the scoring processor.

These and other objects, advantages and features of this invention will become apparent upon review of the following specification in conjunction with the drawings.

BRIEF DESCRIPTION OF THE DRAWINGS

FIG. 1 is a plan view of a test scoring system and method according to the invention;

FIGS. 6a and 6b are signal diagrams illustrating operation of the data transfer unit in FIG. 4;

DESCRIPTION OF THE PREFERRED EMBODIMENT

Figure 2A:
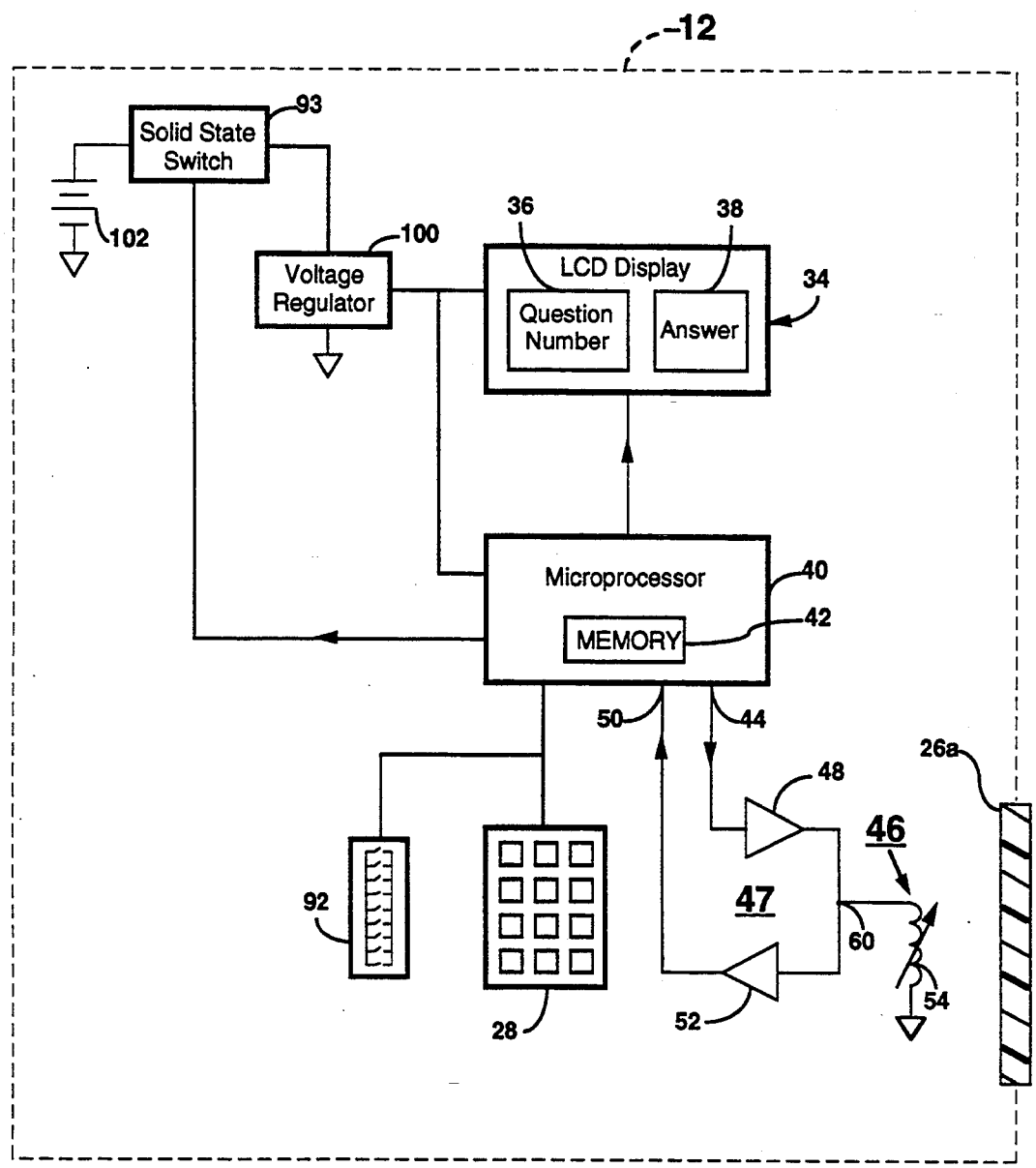
FIGS. 2A and 2B are block diagrams of the units constituting the electrical systems of the test scoring system in FIG. 1.

Referring now specifically to the drawings, and the illustrative embodiments depicted therein, a test scoring system 10 includes a plurality of hand-held answer recording units 12 (only one of which is illustrated), a central scoring processor 14 and a data transfer unit, or docking station, 16 connected with scoring processor 14 by a data cable 18 (FIG. 1). Docking station 16 includes a housing 20 enclosed by a physically impervious wall 22. Wall 22 is offset at 22a to define a cavity 23 in housing 20. Answer recording unit 12 includes a housing 24 enclosed by a physically impervious wall 26. Wall 26 includes an end portion 24a having the same general configuration cavity 23 defined by wall portion 22a. Accordingly, with one of answer recording units 12 positioned with respect to docking station 16, as illustrated in FIG. 1, portion 26a of physically impervious wall 26 will be received within cavity 23 adjacent 22a of physically impervious wall 26. As will be set forth in more detail below, such interface of one of the answer recording units 12 with data transfer unit 16 allows data to be transferred by data transfer unit 20 from the particular answer recording unit 12 to scoring processor 14.

Each answer recording unit 12 includes a keypad 28, made up of three (3) function keys and ten (10) answer keys (FIG. 2A). Each answer recording unit further includes a display 34 having a question display element 36, for displaying the identity of a particular question, an answer display element 38, for displaying an answer entered for the question displayed in question display element 36 and an identification coding array 92 for providing a unique I.D. code for each answer recording unit. Keypad 28, display 34 and array 92 communicate with input and output ports of a microcomputer 40 according to conventional I/O bus protocol. Microcomputer 40 includes internal memory 42 having both nonvolatile ROM for storing control program instructions and volatile RAM for storing answer data entered via keypad 28 as well as other housekeeping information. A solid-state power switch 93 selectively connects a voltage regulator 100 with a battery 102, in order to power the circuits in unit 12, under the control of microcomputer 40. Answer recording unit 12 additionally includes an answer reading circuit 47 including an output port 44 of microcomputer 40 connected with a transducer, generally shown at 46, through a switch 48 and an input port 50 of microcomputer 40 connected with transducer 46 through a decoding circuit 52. Transducer 46, in the illustrated embodiment, is comprised of an antenna 54 connected with junction 60 in common with switch 48 and decoder 52. In this manner, antenna 54 is bidirectional in that it is capable of both transmitting and receiving signals.

Figure 2B:
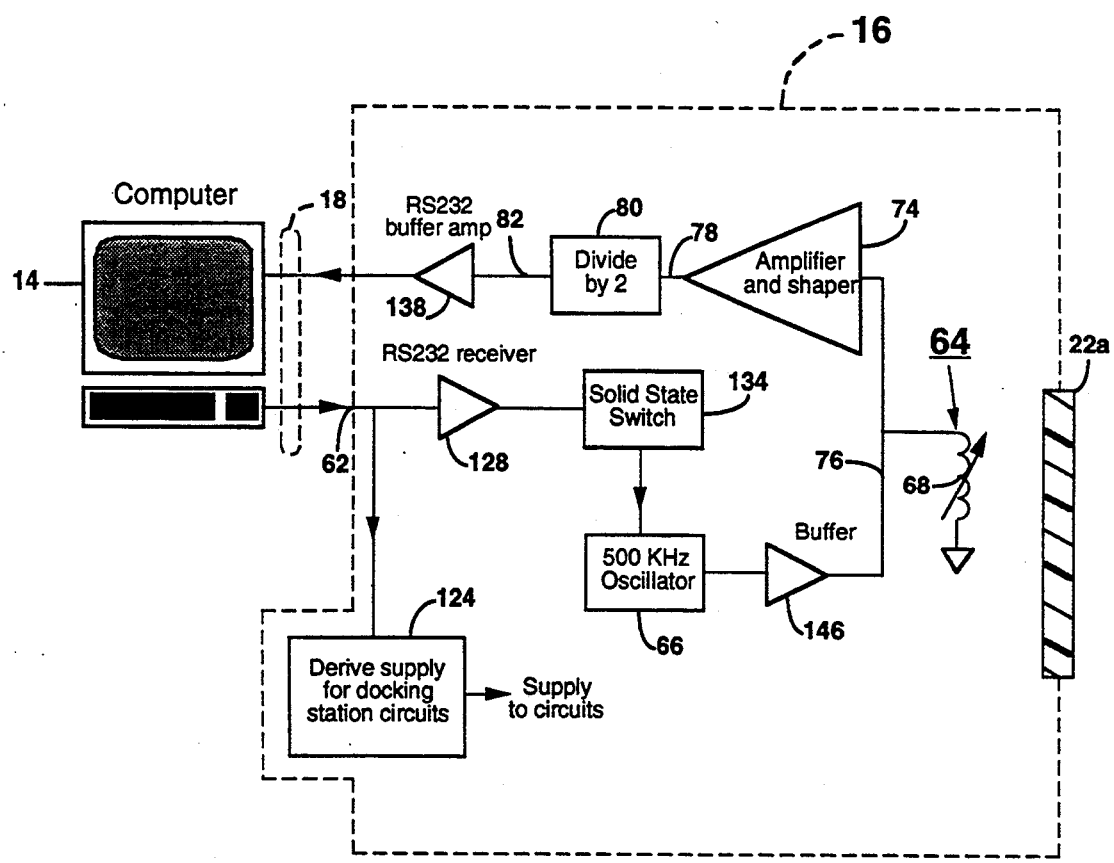

Data transfer unit, or docking station, 16 includes a bidirectional data port 62 for serial data communication over data cable 18 with scoring processor 14 (FIG. 2B). Data port 62, in the illustrated embodiment, is configured according to an industry-standard RS232C protocol. Data transfer unit 16 additionally includes a transducer 64 and an oscillator 66 having an input connected, through a switch 134, with the receiving portion 128 of data port 62 and an output connected, through a high-current buffer 146, with transducer 64. In the illustrated embodiment, transducer 64 includes an antenna 68 connected with a Junction 76. A decoder amplifier 74 receives an input from Junction 76 and produces an output at a junction 78. A divide-by-two circuit 80 receives an input from junction 78 and produces an output 82 on data port 62 through a buffer amplifier 138. Antenna 68 is capable of both transmitting and receiving signals.

Antenna 54 of answer recording unit 12 is adjacent physically impervious wall portion 26a and antenna 68 of data transfer unit 16 is adjacent physically impervious wall section 22a. In this manner, when answer recording unit 12 is juxtaposed with data transfer unit 16, in the manner illustrated in FIG. 1, an inductive coupling is established between antennas 54 and 68.

Operation of the apparatus illustrated thus far is as follows. The teacher prepares an examination in the traditional manner of a written document having the questions and multiple choice answers listed in numbered sequence. Each student is given a copy of the examination and an answer recording unit 12. Each answer recording unit has a unique hard-wired identification code established by coding array 92, which is entered by the teacher in the scoring processor 14 along with the student to whom it is assigned using a keyboard or the like (not shown). The answer recording unit 12 is powered up by actuating any key on keypad 28. The function keys include "up-arrow", "down-arrow" and "clear" keys. The up-arrow and down-arrow keys are used to scroll through question identification numbers displayed on question display element 36. The "up-arrow" key is used to decrement the question number and the "down-arrow" key is used to increment the question number. This arrangement logically corresponds with the organization of questions on a written examination which proceed down the page in ascending question number. The "clear" key clears the answer provided to a particular question if held down momentarily and clears entire memory 42 of answers, by powering-down the answer recording unit, if held down for a longer predetermined period of time, such as three seconds.

After adjusting the question number displayed in question display element 36 to that of the particular questions being answered, the student strokes a desired answer key. The answer, which is stored in memory 42, is displayed on answer display 38. Any answer to a particular question is supplanted by a subsequent answer entered for that question by keypad 28. In the illustrated embodiment, answer recording unit 12 is capable of recording 10 possible answers for each of up to 100 questions. There are 110 question designations, the last 10 of which are provided for software entry of another student I.D. code, such as a student number or social security number. The student I.D. code is entered in memory location 101–110. Each digit is entered by displaying the particular memory location and stroking one of the ten (10) answer keys 32.

After the student has completed the examination and, if desired, entered a student I.D. in the appropriate memory locations, the answer recording unit 12 is placed in proximity with docking station 21, typically both resting on a tabletop, as illustrated in FIG. 1. The teacher then strokes a scoring key associated with scoring processor 14, which causes scoring processor 14 to produce a pulse over cable 18 of a predetermined duration, such as 30 milliseconds. Oscillator 66 responds to the pulse from scoring processor 14 by oscillating at a predetermined frequency which, in the illustrated embodiment, is 500 KHz. Transducer 64 is tuned to resonate at 500 KHz, causing antenna 68 to transmit a 500 KHz continuous wave (CW) signal for the length of the pulse from scoring processor 14. Because of the proximity of antenna 54 to antenna 68, the transmitted CW wave form is inductively coupled to antenna 54 and decoded by decoder 52 causing an input signal on port 50 of the predetermined duration. Microcomputer 40 responds to the signal on port 50 by reading out the answers stored in memory 42, according to a predetermined sequence and protocol, on output port 44. The signal produced on output port 44 is modulated at a 500 KHz pulse repetition rate causing switch 48 to pull junction 60 to ground at a 500 KHz rate. Transducer 46 is tuned to resonate at 500 KHz such that antenna 54 transmits a 500 KHz CW signal having an envelope corresponding to the answer data in memory 42.

Figures 4, 5:
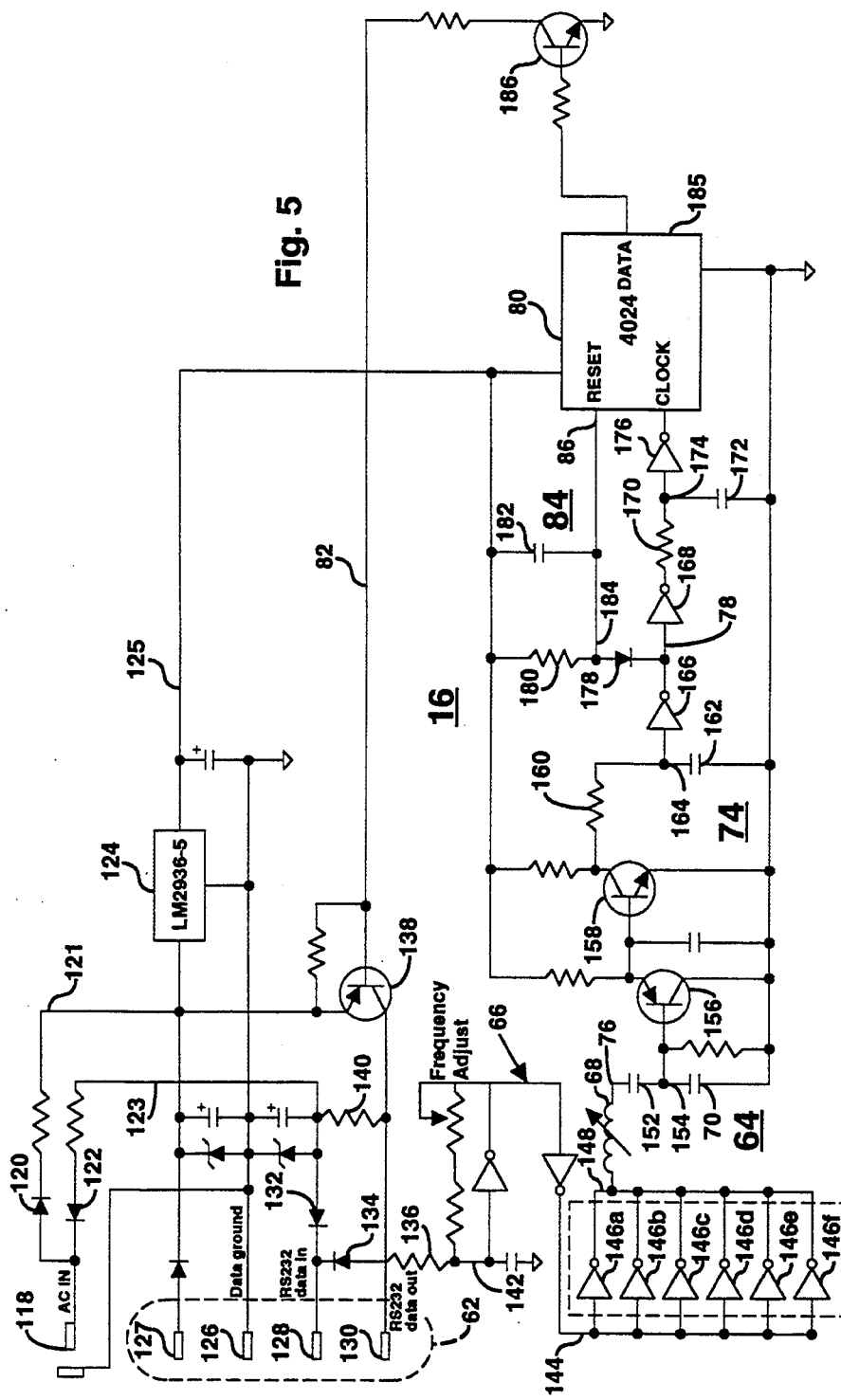
FIG. 4 is a signal diagram illustrating the data transmission that actuates the display of the answer recording unit in FIG. 3.
FIG. 5 is a schematic diagram of the electrical circuit of a data transfer unit.

This data signal, modulated at 500 KHz, is inductively coupled to antenna 68 and provided to decoding amplifier circuit 74 at junction 76. Decoder amplifier circuit 74 produces a signal at junction 78 that corresponds to the envelope of the answer data. Divide-by-two circuit 80 produces a transition on its output 82 in response to every positive-going signal transition input from junction 78 (FIG. 5). Thus, the leading edge (1) of the first input pulse causes output 82 to switch positive at (a). The leading edge (2) of the second input pulse causes output 82 to switch negative at (b), etc. The reason for this data protocol is that it was discovered that the width of pulses on junction 78 is inconsistent due to the particular structure and signal used to transfer data from the answer recording unit to the data transfer unit. However, the time from the leading edge of one pulse to the leading edge of the succeeding pulse is stable. Accordingly, in order to produce a positive-going pulse on output 82 of given duration, signals are sent from the answer reading circuitry of answer recording unit 12 at the appropriate times for the beginning and end of each desired pulse on line 82. Because the portion of the wave form to which divide-by-two circuit 80 responds is accurate, the timing of pulses on output 82 may be made predictable. Although divide-by-two circuit 80 is leading edge responsive, it may alternatively be trailing edge responsive. However, the leading edge of pulses from decoder circuit 74 is considered to be more predictable.

It has been discovered that the improvement in timing accuracy provided by the above technique allows an increase in the baud rate of data transmission from data transfer unit 16 to scoring processor 14. In the illustrated embodiment, data is transmitted at a 9,600 baud. This transfers an entire set of answers in less than 0.25 seconds. Each byte of data transferred from answer recording unit 12 to data transfer unit 16 includes two answers so that it takes 70 data bytes to transfer the 110 answers and student I.D. code in memory 42 and overhead data including a start byte at the beginning, a check sum byte at the end and a version number. The check sum byte is a conventional parity technique that allows the scoring processor to determine whether the received answers were valid. If the data is invalid, another discharge pulse is initiated by scoring processor 14 and produced at transducer 64 of data transfer unit 16. If the received data is valid, scoring processor 14 may, optionally, produce a clear pulse on cable 18 of longer duration than the discharge pulse which is interpreted by answer recording unit 12 as a clear command. Microcomputer 40 responds by clearing the answers from memory 42 and powering down the unit. In the illustrated embodiment, the discharge pulse is a 30 millisecond continuous wave signal and the clear pulse is 80 millisecond continuous wave. A software switch (not shown) in scoring processor 14 allows the teacher to include, or not include, the clear pulse upon receipt of valid data. The data format for the stream of data generated by answer recording unit 12 in response to receipt of a discharge signal is set forth in Table 1.

TABLE 1—ANSWER DATA STREAM

BYTE 1 Start character OAAH (170 decimal).
BYTE 2 Version number. This will allow software to automatically adjust to different versions that might be available in the future.
BYTES 3-65 Answer data 1-110 packed as high and low nibbles. Answers 101-110 reserved for optional user entered ID code.
BYTES 66-68 Address data, high nibbles OCH, low nibbles address bits with 66 being the least significant nibble and 68 the most significant nibble.
BYTE 69 Checksum byte, formed by adding bytes 2 through 68 together with no carry.
BYTE 70 End character OACH (172 decimal).

Figure 3:
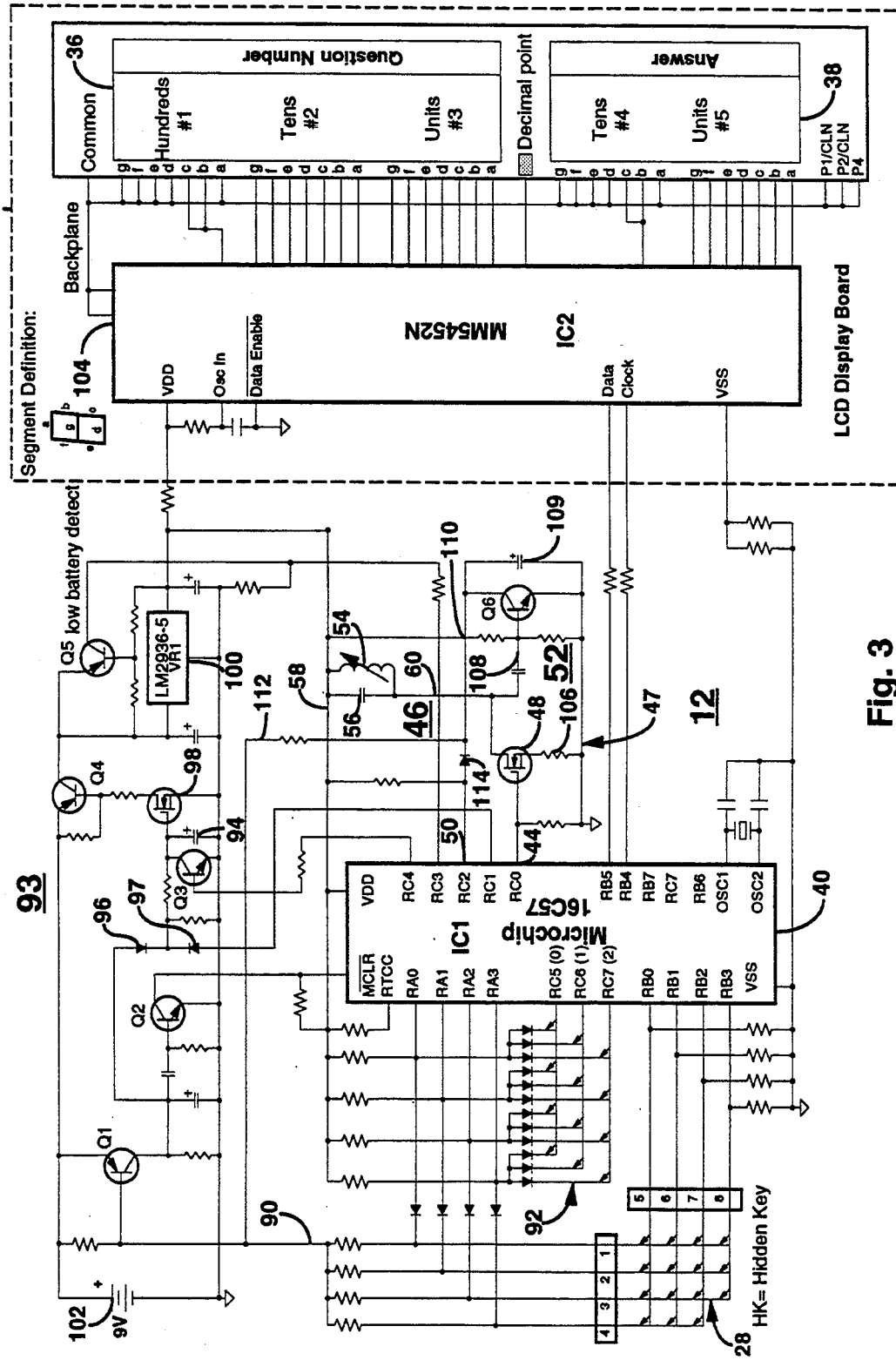
FIG. 3 is a schematic diagram of the electrical circuit of an answer recording unit.

The function and answer keys constituting keypad 28 are arranged in a conventional multiplex grid (FIG. 3). When a key is stroked, a signal is received at one input RA0-RA3 of microcomputer 40 and a line 90 is toggled low. The toggling of line 90 causes a transistor Q1 to be switched into conducting which causes a transistor Q2 to be switched off which provides a reset pulse to an MCLR input to microcomputer 40. This is a "wake-up" signal indicating to the microcomputer that an activity has occurred. Microcomputer 40 additionally receives inputs from coding array 92, which is hard-wire programmed in order to establish a unique identification code for the particular answer recording unit 12. The unique address is transferred in the stream of answer data bytes in response to a discharge pulse. A capacitor 94 and diode 96, in combination with an FET 98 and transistor Q4, constitute power switch 93. Capacitor 94 is charged through diode 96 whenever a key is struck. This switches FET 98 and transistor Q4 into conduction which applies power from battery 102 to voltage regulator 100 to power the unit. The MCLR input also sets a software counter in microcomputer 40. In the absence of any activity, microcomputer "wakes-up" every 2-½ seconds and momentarily toggles an output RC1 to apply a charge to capacitor 94 through a diode 97 to cause FET 98 and transistor Q4 to continue to conduct. When the microcomputer "wakes-up" in this manner, the software counter is decremented. Once it reaches zero, output RC1 is not toggled, so capacitor 94 does not get charged. This, in turn, causes FET 98 and transistor Q4 to not conduct which will remove power from a voltage regulator 100. In the illustrated embodiment, power will be removed from voltage regulator 100 if a key has not been struck for approximately 45 minutes. If the "clear" function key 30 is held closed for more than a predetermined period of time, such as three seconds, or if a clear pulse has been received from data transfer unit 16, microcomputer 40 causes an output RC4 to go high which energizes a transistor Q3 to immediately discharge capacitor 94. This removes power from voltage regulator 100. Because the memory 42 of microcomputer 40 in which answer data is stored is volatile, the removal of power from voltage regulator 100 powers down the unit 12 to conserve battery life and causes the answers to be cleared from memory 42.

A transistor Q5 is connected with respect to voltage regulator 100 to provide a low battery detect sensor and provide an input on line RC3 when the level of voltage of battery 102 decreases below a predetermined level. Microcomputer 40 responds to a low battery detect signal by blinking one or more digits on display 34. Output ports RB4 and RB5 of microcomputer 40 drive display decoder circuit 104 in display 34 in a conventional bi-phase manner using the serial data protocol illustrated in FIG. 4.

Output port 44 is provided to the gate of a field effect transistor which constitutes switch 48. The drain of FET switch 48 is connected to junction 60 with the tuned resonant circuit defined by a capacitor 56 and antenna 54 in electrical parallel connection between junction 60 and a voltage source 58. The source of FET switch 48 is connected through a current limiting resistor 106 to signal ground. Decoding circuit 52 includes a transistor Q6 whose base is connected through a capacitor 108 to junction 60. The collector-emitter junction of transistor Q6 is connected across a capacitor 109, which extends between signal ground and a line 110. Line 110 is branched, having a first leg 112 joining line 90 and a second leg extending to input port 50 through a diode 114. When a discharge signal or a clear signal is generated by data transfer unit 16, it is coupled to antenna 54 causing transistor Q6 to saturate and discharge capacitor 108. This pulls line 110 low for the duration of the signal, which causes transistors Q1/Q2 to "wake-up" microcomputer 40 and is received as an input signal on input port 50 (RC2). The microcomputer responds, according to the duration of the signal, either by reading the answer data from memory 42 or by toggling output RC4.

When answer data is read, output port 44 is pulsed at a 500 KHz pulse repetition rate for periods of time established by the content of answer data in memory 42. Each time output port 42 is pulsed, switch 48 conducts which pulls junction 60 low causing the tuned resonant circuit 46 to resonate at 500 KHz. The purpose of resistor 106 is to serve as a current limiter if switch 48 is left in a conducting mode for an extensive period of time. This prevents damage to FET 48 or excessive battery drain if microcomputer 40 stalls. While transistor Q6 will saturate in response to the periodic switching of switch 48 during the transfer of answer data to the data transfer unit 16, the microcomputer 40 ignores the signal on its input 50 because it is in a data transfer mode.

The particular arrangement of answer reading circuit 47 provides a high-Q parallel tuned resonant circuit 46 that is ideal for both transmitting and receiving signals. Because the outputs of microcomputer 40 occasionally go into a tri-state mode, and it is possible that a discharge pulse may be incoming coincident with such mode, the use of a parallel resonant circuit in combination with FET 48 and current limiting resistor 106 allows decoding circuit 52 to be operational at all times. FET 48 isolates the resonant circuit from the microcomputer at all times that the unit is not transferring out answer data.

In the illustrative embodiment, microcomputer 40 is a commercially available 8 bit microcontroller having two (2) kilobytes of internal ROM and 80 bytes of internal RAM, One such unit is marketed by the Microchip Technology Incorporated unit of General Instruments under Model No. 16C57. The components making up display 34 are commercially available. Display decoder 104 is commercially available and is marketed by National Semiconductor under Mode No. MM5452N. Question display element 36 is a three digit, seven segment liquid crystal display. Answer display element 38 is a two digit, seven segment liquid crystal display. Question display element 36 and answer display, element 38 are combined into one commonly available five digit display.

Data transfer unit 16 receives power from a low-voltage AC input 188 which is rectified by a diode 120 to provide a positive voltage line 121 and by a diode 122 to provide a negative voltage line 123 (FIG. 5). Positive voltage line 121 supplies a voltage regulator 124 to provide regulated voltage on line 125. Alternatively, regulator 124 may receive a supply voltage from a power line 127, included with data port 62. Data port 62, which is an industry-standard RS232C serial port, includes a data ground terminal 126, a power line terminal 127, a data-in terminal 128, and a data-out terminal 130. Data-in terminal 128 is connected through a diode 132 to negative voltage line 123 and through a series combination of a diode 134 and resistor 136 to oscillator 66. Data-out terminal 130 is connected through the emitter-collector junction of a transistor 138 to positive voltage line 121 and through a pull-up resistor 140 to negative voltage line 123. In this manner, when scoring processor 44 produces on data-in terminal 128 a negative signal, with respect to data ground terminal 126, input 142 of oscillator 66 is clamped to ground through resistor 136 and diode 134. This prevents oscillator 66 from oscillating. When scoring processor 14 produces a positive signal on data-in terminal 128, with respect to ground, diode 134 becomes reverse-biased allowing oscillator input 142 to float. This allows oscillator 66 to oscillate. Accordingly, scoring processor 14 is able to control the operation of oscillator 66 by issuing data characters on data-in terminal 128 that drive terminal 128 high for a period of time that is predetermined to produce either a discharge pulse or a clear pulse. Oscillator 66 produces a 500 KHz square wave on its output 144 for the duration of time that data-in terminal 128 is held high.

Output 144 is connected through high-current buffer 146, made up of a plurality of parallel inverter circuits 146a–146f, to a terminal 148 of antenna 68. The other terminal 150 of antenna 68 is connected to a capacitor 152 which is joined with capacitor 70 at a junction 154. Junction 154 is, in turn, connected with the base of a PNP transistor 156 whose emitter is connected with the base of an NPN transistor 158. The collector of transistor 158 is, in turn, connected to signal ground through series connected resistor 160 and capacitor 162. The junction 164 between resistor 160 and capacitor 162 is connected through an inverter 166 to junction 78. Junction 78 is connected through an inverter 168 to signal ground through a series connected resistor 170 and capacitor 172. The junction 174 between resistor 170 and capacitor 172 is connected through an inverter 176 to the clock input of divide-by-two circuit 80. Junction 78 is connected through a diode 178 to a junction 184. A network including parallel resistor 180 and capacitor 182 is connected between junction 184 and regulated voltage line 125. Junction 184 is provided to the reset input of divide-by-two circuit 80. The output of 185 divide-by-two circuit 80 is connected with the base of an NPN transistor 186 whose emitter-collector junction is connected with the base of transistor 138 over output line 82.

The data transfer unit, or docking station, 16 operates as follows. After an answer recording unit is juxtaposed with the docking station 16 and the teacher strokes a scoring key, scoring processor 14 produces a high voltage at data-in terminal 128 for a predetermined time, such as 30 milliseconds, by sending a sequence of null characters on cable 18. This causes oscillator 66 to oscillate at 500 KHz during this period. Parallel inverters 146a–146f are current drivers that are capable of supplying adequate current to the tuned resonant circuit 64 defined by antenna 68, capacitor 152 and capacitor 70. This causes a 500 KHZ continuous wave discharge signal to be generated for the predetermined period of time. The discharge signal is coupled to the answer recording unit.

Answer recording unit 12 will respond to the discharge signal by transmitting answer data to antenna 68 that is inductively coupled with antenna 54. The answer data signal that is received by antenna 68 is scaled by the voltage divider defined by capacitors 152 and 70. Decoding amplifier circuit 74, defined by transistors 156, 158, resistor 160 and capacitor 162, removes the carrier frequency to produce an envelope signal which is buffered by invertors 166, 168 and 176 and supplied to the clock input of divide-by-two circuit 80. Divide-by-two circuit 80 responds to the rising leading edge of the envelope wave form by producing an output 185 to toggle transistor 186 between conducting and nonconducting states at the rising edge of every pulse of the envelope at junction 78. Thus, output transistor 186 is switched on in response to a first leading edge and switched off in response to the second leading edge, etc. Activity monitor circuit 84 responds to the envelope signal at junction 78 by resetting divide-by-two circuit 80 when activity has not occurred for a predetermined period of time. In this manner, divide-by-two circuit 80 is prepared for the next sequence of data signals transmitted from an answer recording unit 12. Transistor 138 responds to transistor 186 being switched into a conducting state by pulling data-out terminal 130 to the level of positive voltage line 121 and responds to transistor 186 being in a nonconducting state by switching off, which allows pull-up resistor 140 to pull data out terminal 130 to the voltage level of negative voltage line 123. In this manner, data is provided out of port 68 in response to signals received by antenna 68. Thus, docking station 16 is transparent to answer data transmitted from the respective answer recording unit 12 to scoring processor 14.

Although oscillator 66 may discontinue oscillation in either a high or low state, and, hence, it is not possible to know the voltage that will be present at junction 148 between discharge pulses (which may be an extensively long period of time), the particular arrangement will not produce a DC current drain because the series connection of antenna 68 and capacitors 152 and 154 to signal ground has a very high DC resistance. However, at an RF signal frequency, such as 500 KHz, junction 148 has an impedance that is effectively at signal ground, which causes tuned resonant circuit 64 to have the effective configuration of a parallel resonant circuit. This provides a high-Q tuned circuit which efficiently produces a CW signal that is low in harmonics.

Figure 8:
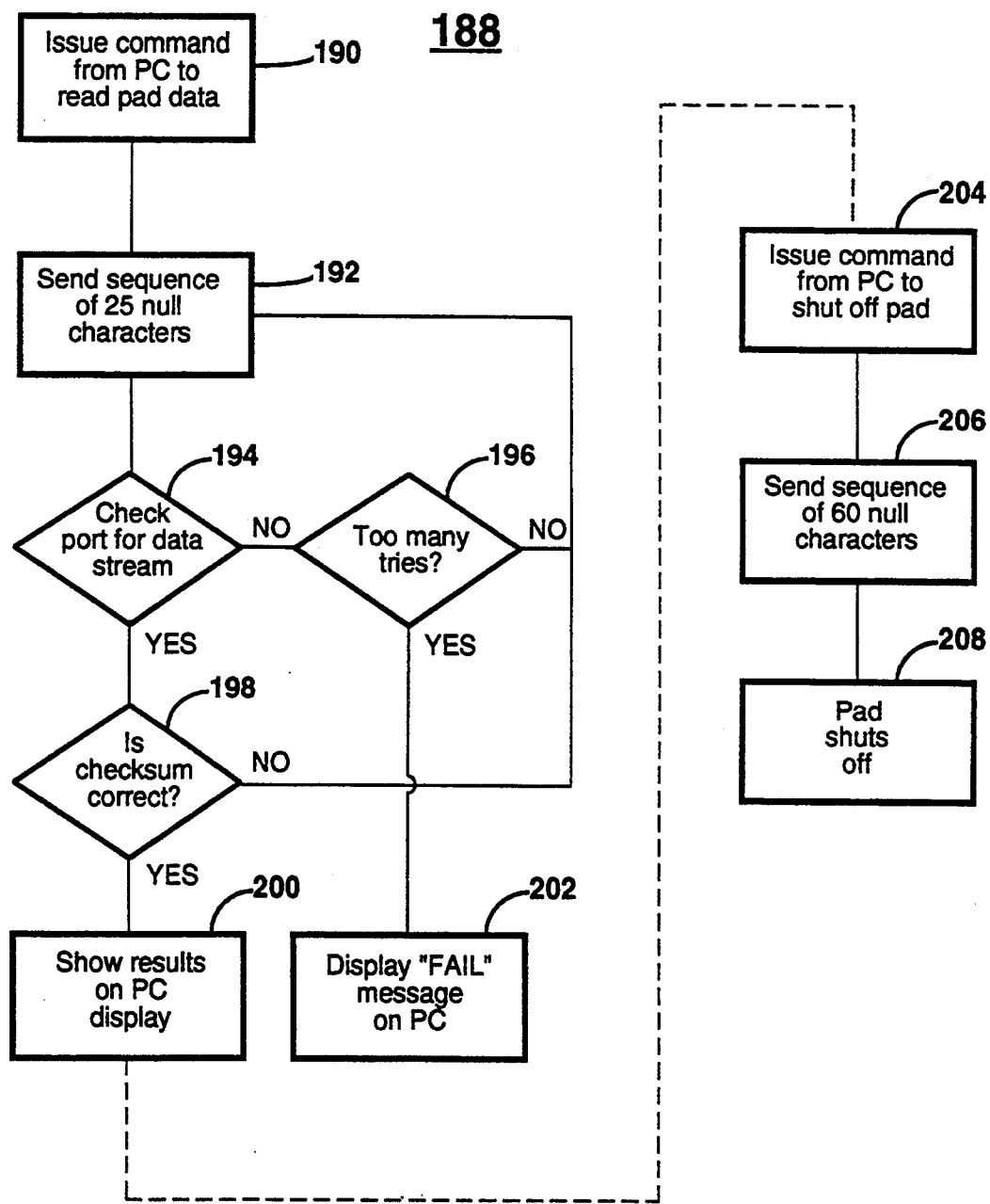
FIG. 8 is a flow diagram of an operating program useful with a scoring processor.

When it is desired to read the answers from a particular answer recording unit 12 to scoring processor 14, a software routine 188 is initiated in the scoring processor by the operator stroking an input key to processor 14. This causes the scoring processor to issue a read command, at 190, over cable 18 to data transfer unit 16 (FIG. 8). This is accomplished by sending a sequence of 25 null characters at 192 which produces a 30 millisecond positive signal on data in line 128 of the data transfer unit, which causes the data transfer unit to generate a 30 millisecond burst of 500 KHz CW as a discharge signal. The scoring processor then checks at 194 the data port connected with cable 18 for incoming data. If data is not received within a predetermined period of time from sending the sequence of characters at 192, the program determines at 196 whether a given number of tries has been exceeded. If not, control returns to 192 for re-transmittal of the sequence of characters making up the discharge signal. If it is determined at 196 that the predetermined number of unanswered discharge signals has been exceeded, then the routine is exited at 202 and a error signal is provided to the operator. If it is determined at 194 that incoming data is being received in response to the discharge signal, the check sum of the incoming data stream is examined at 198 to verify whether there is agreement with the check sum byte in the data stream, according to the conventional techniques. If so, the answer data is compared with an answer key entered by the operator and the results displayed on the processor screen at 200. If the check sum is determined at 198 to not be correct, control returns to 192 where the discharge signal is again generated by transmittal of a null character sequence.

If an option of clearing the answers from answer recording units upon receipt of a valid set of data is chosen, as indicated by the phantom line extending from function 200 to function 204, then control passes to 204 where scoring computer 14 issues a clear signal by sending a sequence of 60 null characters at 206 which pulls data-in terminal 108 high for approximately 80 milliseconds. This causes the data transfer unit to generate a 80 millisecond burst of 500 KHz CW, which causes the corresponding answer recording unit to power down, at 208, by turning off the power switch 93.

Figure 7:
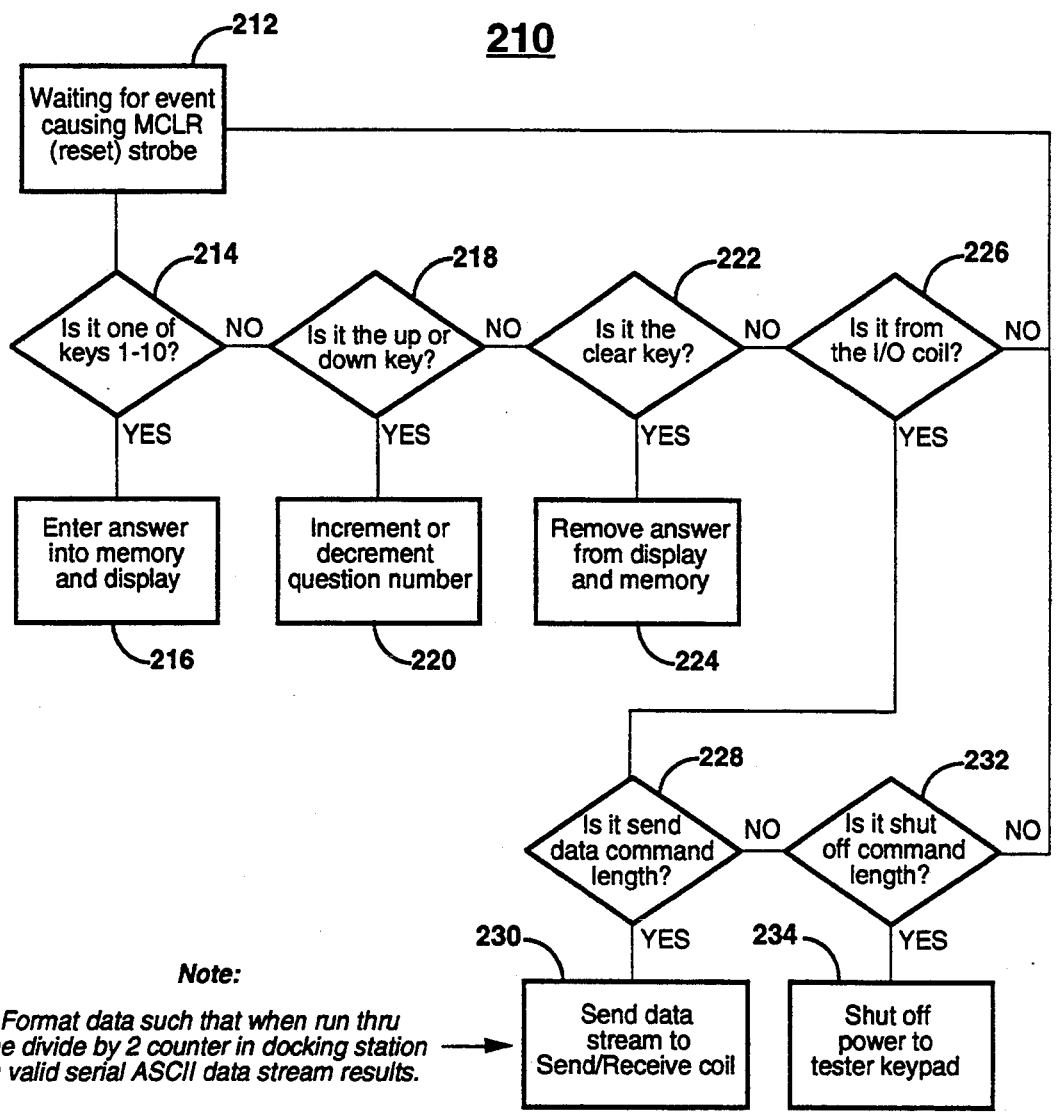
FIG. 7 is a flow diagram of a control program for use with the answer recording unit circuit illustrated in FIG. 3.

Microcomputer 40 in each answer recording unit 12 includes a software routine 210 which responds to an input on the MCLR port at 212 by determining at 214 whether the input was a result of one of the answer keys being stroked (FIG. 7). If so, then the selected answer is entered, at 216, into the location of memory 42 corresponding to the number displayed on question number display 34. If not, then it is determined at 218 whether an "up" or "down" function key is being stroked. If so, control passes to 220 where the memory pointers associated with the question number displayed on display 36 are incremented or decremented at 220. If it was not an answer key or an "up" or "down" function key that strobed the MCLR input, control then passes to 222 where it is determined whether it is the "clear" function key that is being stroked. If so, control passes to 224 where the answer data in the memory location corresponding to the question number displayed on display 36 is cleared.

If no key is being depressed (214, 218, 222), then it is determined at 226 whether it is the receipt of a signal from decoding circuit 52 on input port 50 which strobed the MCLR input. If not, then the control returns to the waiting mode at 212. If it is determined at 226 that a signal received by transducer 46 strobed the MCLR input, then it is determined at 228 whether the signal had a length corresponding to a discharge signal. If so, then a data stream is generated, at 230, by microcomputer 40 having a format that, when divided by divide-by-two counter 80 in the data transfer unit, produces an ASCII data stream corresponding with the data format set forth in Table 1. If it determined at 228 that the length of the received signal is not a discharge signal, then it is determined at 232 whether the length of the received signal corresponds with a clear signal. If so, microcomputer 40 responds at 234 by shutting off power switch 93 which powers down the answer recording unit 12 and, thereby, clears any recorded answers from memory 42.

In the illustrated embodiment, capacitor 56 is 150 picofareds, capacitor 152 is 220 picofareds and capacitor 70 is 330 picofareds. Antennas 54 and 68 are identical and made from 300 turns of 36 AWG wire wound around a ferrite core having an inductance of 500 microhenries. Divide-by-two circuit 80 is a commercially available integrated circuit model 4024 which is manufactured by many leading semiconductor manufacturers. As previously set forth, tuned circuits 40 and 64 are tuned to a resonant frequency of approximately 500 KHz. Oscillator 66 is designed to oscillate at approximately 500 KHz and microcomputer 40 pulses FET 48 at a 500 KHz rate.

Various changes and modifications in the specifically described embodiments will be apparent to the skilled artisan. Although transducers 46 and 64 are illustrated as tuned parallel resonant circuits, infrared sensors may be substituted and the physical impervious properties of walls 22 and 26 retained by making portions of wall segments 22a and 26a from transparent lens members integral with adjacent wall surfaces. However, the infrared transducers require separate transmitter and receiver portions and therefore do not make use of individual elements that are capable of both transmitting and receiving signals as with the preferred embodiment. In addition, the alignment of infrared sensors and receivers is more critical than with inductive coupling of antennas 54 and 68. In addition, particular vulnerabilities remain with the infrared system that are not present with the inductively coupled system. Opaque items, such as chewing gum, may cover the transparent lenses in an infrared system but would have substantially no impact upon the inductively coupled system. However, the infrared system would have the advantage of remaining significantly less vulnerable than the known prior art systems.

Other changes and modifications in the specifically described embodiments can be carried out without departing from the principles of the invention which is intended to be limited only by the scope of the appended claims, as interpreted according to the principles of patent law including the Doctrine of Equivalents.

The embodiments of the invention in which an exclusive property or privilege is claimed are defined as follows:

1. A test scoring system comprising:
   a hand-held answer recording unit having a user input device for receiving user answers and a storage device for storing said user answers;
   a scoring processor for receiving answer data from said answer recording unit;
   a data transfer unit connected with said scoring processor for providing a single bit discharge command signal to said answer recording unit, for receiving answer data from said answer recording unit and for transferring said answer data to said scoring processor;
   wherein said answer recording unit includes a monitor circuit that is responsive to said discharge command signal to read-out answer data recorded in said memory locations as data words;
   wherein each said answer recording unit and said data transfer unit includes a housing defined by a physically substantially imperforate wall; and
   a non-symmetrical communication link between said answer recording unit and said data transfer unit including a pair of transducers, each transducer entirely within the respective housing of each of said answer recording unit and said data transfer unit, for transferring data words from said answer recording unit to said data transfer, unit, and single bit command signals from said data transfer unit to said answer recording unit between said transducers across said imperforate walls, whereby multiple bit data words can be transferred by said non-symmetrical communication link in response to a single bit discharge command signal.

2. The test scoring system in claim 1 wherein said data transfer unit includes means for generating said discharge command signal in response to a discharge request from said scoring processor.

3. The test scoring system in claim 1 wherein said data transfer unit includes means for providing a clearing command signal to said answer recording unit and wherein said answer recording unit is responsive to said clearing command signal to delete said answer data recorded therein.

4. The test scoring system in claim 3 wherein said data transfer unit includes means for generating said clearing command signal in response to a clearing request from said scoring processor.

5. The test scoring system in claim 4 wherein said data transfer unit includes means for generating said discharge command signal in response to a discharge request from said scoring processor.

6. The test scoring system in claim 1 wherein said discharge command signal is a continuous wave signal having a predetermined frequency for a first period of time.

7. A method of testing a plurality of individuals including the steps of:
   providing to each individual a hand-held recording unit having a first housing defined by a first physically substantially impervious wall, a monitor circuit including a first transducer that is entirely within said first housing, a plurality of memory location, a user input device and logic circuitry to store an answer for one test question entered with said input device in each of said memory locations;
   storing a unique identification code in at least one of said memory locations;
   each individual entering with said input device a chosen answer for each test question in a particular memory location;
   providing a scoring processor that is programmed to compare said answers with an answer key;
   providing a data transfer unit connected with said scoring processor for transferring answers from each said hand-held recording unit to said scoring processor, said data transfer unit including a second housing defined by a second physically substantially impervious wall and a second transducer entirely within said second housing;
   juxtaposing one said recording unit in which answers are entered in memory locations with said data transfer unit;
   supplying a discharge signal from said second transducer to said first transducer of said recording unit juxtaposed with said data transfer unit;
   retrieving with said monitor circuit substantially all of said answers and said unique identification code from said memory locations of said recording unit juxtaposed said data transfer unit in sequential order, in response to said discharge signal;
   transferring said answers and said identification code retrieved from said memory locations from said first transducer to said second transducer and from said data transfer unit to said scoring processor; and
   comparing said answers in said scoring processor with said answer key in order to determine conforming answers.

8. The method in claim 7 including determined whether answers transferred to said scoring processor are valid.

9. The method in claim 8 including selectively supplying a clearing signal to said recording unit juxtaposed said data transfer unit in order to erase said answers from said memory locations in response to determining that answers transferred to said scoring processor are valid.

10. The method in claim 7 including supplying another said discharge signal to said recording unit in response to determining that answers transferred to said scoring processor are not valid.

11. The method in claim 7 wherein said supplying said discharge signal includes generating a continuous wave signal for a predetermined period of time.

12. The method in claim 7 wherein said storing a unique identification code includes permanently storing a first unique code and storing a second unique identification code entered by the individual.

13. A test scoring system comprising:

a hand-held answer recording unit including a first housing defined by a first physically substantially impervious wall, input means for receiving user answers to questions, memory means for storing a plurality of said answers and a monitor circuit that is responsive to a discharge signal for reading said answers from said memory means, for producing an answer signal encoded with leading and trailing edges and for transferring said answer signal through said first substantially impervious wall, wherein said monitor circuit includes a first transducer entirely within said first housing for receiving said discharge signal from said data transfer unit and transferring said answer signal to said data transfer unit;

a scoring processor for receiving answer data from said recording unit;

a data transfer unit connected with said scoring processor and including a second housing defined by a second physically substantially impervious wall and a transfer circuit for providing a discharge signal, for receiving said answer signal from said recording unit through said second physically substantially impervious wall and for decoding said answer signal by responding to only said leading edges or only said trailing edges to produce answer data, said transfer circuit including a second transducer entirely within said second housing; and wherein, with said first transducer aligned with said second transducer, said discharge signal and said answer signal can be transferred between said answer recording unit and said data transfer unit through said first and second physically substantially impervious walls.

14. The test scoring system in claim 13 wherein said first and second transducers are antennas in tuned resonant circuits.

15. The test scoring system in claim 14 wherein said first transducer is in a parallel tuned resonant circuit and said second transducer is in a series tuned resonant circuit for said providing said discharge signal and in a parallel tuned resonant circuit for said receiving said answers.

16. The test scoring system in claim 15 wherein said first transducer is connected with an output port of a microprocessor.

17. A test scoring system comprising:

a hand-held answer recording unit including a first housing defined by a first physically substantially impervious wall, input means for receiving user answers to questions, memory means for storing a plurality of said answer and a monitor circuit that is responsive to a discharge signal for reading said answers from said memory means, for producing an answer signal encoded with leading and trailing edges and for transferring said answer signal through said first substantially impervious wall, said monitor circuit including a first transducer entirely within said first housing;

a scoring processor for receiving answer data from said recording unit;

a data transfer unit connected with said scoring processor and including a second housing defined by a second physically substantially impervious wall and a transfer circuit for providing a discharge signal, for receiving said answer signal from said recording unit through said second physically substantially impervious wall and for decoding said answer signal by responding to only said leading edges or only said trailing edges to produce answer data, wherein said transfer circuit includes a second transducer entirely within said second housing for receiving said answers from said answer recording unit and transferring said discharge signal to said answer recording unit; and wherein, with said first transducer aligned with said second transducer, said discharge signal and said answer signal can be transferred between said answer recording unit and said data transfer unit through said first and second physically substantially imperious walls.

18. The test scoring system in claim 17 wherein each said transducer is an antenna in a tuned resonant circuit.

19. A test scoring system comprising:

a hand-held answer recording unit having a first housing defined by a first physically substantially impervious wall, a user input device for receiving user answers, a storage device for storing said user answers and a monitor circuit that is responsive to a discharge signal for reading answer data recorded in a storage device;

a scoring processor for receiving answer data from said answer recording unit;

a data transfer unit connected with said scoring processor for providing said discharge signal to said answer recording unit, for receiving answer data from said answer recording unit and for transferring said answer data to said scoring processor, wherein said data transfer unit including a second housing defined by a second physically substantially impervious wall and a decoding circuit for decoding data words transferred from said answer recording unit, said decoding circuit responsive to only leading edges or only trailing edges to decode said data word; and a non-symmetrical communication link between said answer recording unit and said data transfer unit including a pair of transducers, each transducers entirely within the respective housing of each of said answer recording unit, and said data transfer unit for transferring data words from said answer recording unit to said data transfer unit, wherein said communication link transfers only single bit command signals from said data transfer unit to said answer recording unit.

20. A test scoring system comprising:

a hand-held answer recording unit having a first housing defined by a first physically substantially impervious wall, a user input device for receiving user answers and a storage device for storing said user answers;

a scoring processor for receiving answer data from said answer recording unit;

a data transfer unit connected with said scoring processor for providing a discharge signal to said answer recording unit, for receiving answer from said answer recording unit and for transferring said answer data to said scoring processor, wherein said discharge signal is a continuous wave signal having a predetermined frequency for a first period of time and wherein said data transfer unit includes a second housing defined by a second substantially impervious wall;

wherein said answer recording unit includes a monitor circuit having a first transducer entirely within said first housing and is responsive to said discharge signal for transferring answer data recorded in said answer recording unit to said data transfer unit;

wherein said data transfer unit including a transfer circuit having a second transducer entirely within said second housing for providing a cleaning signal to said answer recording unit and wherein said answer recording unit is responsive to said clearing signal to delete said answer data recorded therein, wherein said clearing signal is a continuous wave signal having said predetermined frequency for a second period of time that is significantly different from said first period of time; and a non-symmetrical communication link between said answer recording unit and said data transfer unit for transferring data words from said answer recording unit to said data transfer unit, wherein said communication link transfers only single bit command signals from said data transfer unit to said answer recording unit.

21. A test scoring system comprising:

a hand-held answer recording unit including a first housing defined by a first physically substantially impervious wall, a memory device having a plurality of memory locations, at least one function key for selecting one of said memory locations, at least one response key for selecting an answer, means for storing answer data selected by said response key in memory locations selected by said function key, a display device having a first character display for displaying a question number in said one of said memory locations and a second character display for displaying an answer in said one of said memory locations;

a scoring processor for receiving answer data from said answer recording unit;

a data transfer unit connected with said scoring processor for providing a discharge signal to said answer recording unit, for receiving answer data from said answer recording unit and for transferring said answer data to said scoring processor, said data transfer unit including a second housing defined by a second physically substantially impervious wall; and wherein said answer recording unit includes a monitor circuit that is responsive to said discharge signal to read-out answer data recorded in said memory locations and transmit answer data read from said memory locations to said data transfer unit, wherein said monitor circuit includes a first transducer entirely within said first housing for receiving said discharge signal and transmitting said answer data and said data transfer unit includes a second transducer entirely within said second housing for receiving said answer data and for transmitting said discharge signal.

22. A test scoring system comprising:

a hand-held answer recording unit including a first housing defined by a first physically substantially impervious wall, a memory device having a plurality of memory locations, at least one function key for selecting one of said memory locations, at least one response key for selecting an answer, means for storing answer data selected by said response key in memory locations selected by said function key, a display device having a first character display for displaying a question number in said one of said memory locations and a second character display for displaying an answer in said one of said memory locations;

a scoring processor for receiving answer data from said answer recording unit;

a data transfer unit connected with said scoring processor for providing a discharge signal to said answer recording unit, for receiving answer data from said answer recording unit and for transferring said answer data to said scoring processor, wherein said data transfer unit includes a second housing defined by a second physically substantially impervious wall and a decoding circuit for said answer data transmitted by said answer recording unit, said decoding circuit responsive to only leading edges or only trailing edges to decode said transmitted answer data and including a second transducer entirely within said second housing; and wherein said answer recording unit includes a monitor circuit that is responsive to said discharge signal to read-out answer data recorded in said memory locations and transmit answer data read from said memory locations to said data transfer unit, said monitor circuit including a first transducer entirely within said first housing.

* * * * *

UNITED STATES PATENT AND TRADEMARK OFFICE
CERTIFICATE OF CORRECTION

PATENT NO. : 5,379,213

DATED : January 3, 1995

INVENTOR(S) : Harry G. Derks

It is certified that error appears in the above-indentified patent and that said Letters Patent is hereby corrected as shown below:

Column 4, line 57:
"24a" should be --26a--.

Column 5, line 42:
"Junction 76" should be --junction 76--.

Column 5, line 43:
"Junction 76" should be --junction 76--.

Column 9, line 37:
"RAM," should be --RAM.--.

Column 9, line 42:
"Mode" should be --Model--.

Column 13, line 55:
After "transfer" delete --,--.

Column 14, line 23, claim 7:
"location" should be --locations--.

Column 14, line 60, claim 8:
"determined" should be --determining--.

Column 15, line 64, claim 17:
"answer" should be --answers--.

Column 16, line 49, claim 19:
"word" should be --words--.

UNITED STATES PATENT AND TRADEMARK OFFICE
CERTIFICATE OF CORRECTION

PATENT NO. : 5,379,213

DATED : January 3, 1995

INVENTOR(S) : Harry G. Derks

It is certified that error appears in the above-indentified patent and that said Letters Patent is hereby corrected as shown below:

Column 16, line 52, claim 19:
    "transducers" should be --transducer--.

Column 17, line 3, claim 20:
    After "answer" (second occurrence) insert --data--.

Column 17, line 17, claim 20:
    "including" should be --includes--.

Column 17, line 19, claim 20:
    "cleaning" should be --clearing--.

Signed and Sealed this

Third Day of October, 1995

Attest:

BRUCE LEHMAN

*Attesting Officer*      *Commissioner of Patents and Trademarks*